United States Patent Office 2,943,680
Patented July 5, 1960

2,943,680

HARD PLANT SEEDS IN WELL-SERVICING COMPOSITIONS AND METHODS

Platho P. Scott, Jr., Tulsa, Okla., and Alfred O. Fischer, Alice, Tex., assignors to Pan American Petroleum Corporation, a corporation of Delaware No Drawing. Filed July 15, 1955, Ser. No. 522,365

29 Claims. (Cl. 166—21)

This invention relates to the use of the hard portions of plant seeds, ground to granular form, in well-servicing slurries used in wells for various purposes such as drilling, work-over, cementing, and the like.

This application is a continuation-in-part of our application Serial No. 269,529, filed February 1, 1952, now abandoned. That application teaches broadly the applicability, for the above-stated uses, of certain hard nutshells such as walnut shells and pecan shells, the hard portions of drupes such as coconut shells, and other hard portions of plant seeds such as the outer covering of the fruit of the Brazil nut tree. These hard materials are ground to a granular form and are employed in well-servicing operations such as drilling.

It has now become possible to define the scope of the invention much more accurately than was possible on the basis of data available when the parent application was filed. The principal purpose of this application is to define more accurately the inherent properties of the materials described in the parent application in terms of recognized tests of the properties of solids so as to distinguish more clearly between operable and inoperable materials.

The principal object of this invention is to provide an improved additive for well-servicing liquids such as drilling fluids and cement slurries, the additive serving to form permanent bridges in natural or artificially created fractures, crevices, fissures, vugs, and the like in formations penetrated by a well. Another object of the invention is to provide a well-servicing liquid such as a drilling fluid or cement slurry which will bridge and seal natural or artifically created fractures to prevent excessive loss of the liquids from the wells. Still another object of our invention is to provide a method for servicing a well which will tend to prevent fracturing of the formations and will seal any fractures which form.

As taught in the parent application, it has now been found that by use of certain hard portions of plant seeds, ground to certain particle size ranges and shapes and used in certain concentrations, surprisingly effective bridges and seals can be formed in and across the crevices, fractures and the like in formations penetrated by wells. The term "plant seeds" is used broadly to include outer shells such as nut shells, for example. The limits on these various factors will now be considered in more detail:

PARTICLE SIZE DISTRIBUTION

In general, substantially all the additive particles should pass a number 4 screen and be retained on a number 100 screen. These screen sizes, together with others mentioned herein, are U.S. standard Sieve Series (1940)—Fine Series Numbers. These are described, for example, in Handbook of Chemistry and Physics, published by Chemical Rubber Publishing Company, 36th edition, p. 3079. Particles in this size range are normally referred to as "4- to 100-mesh particles." A number 30 screen is frequently termed "a 30-mesh screen."

Particles passing a 100-mesh screen are not necessary since nearly all drilling fluids and cement slurries contain sufficient small particles to form a seal on a bridge containing 100-mesh particles. In addition, this very fine material tends to thicken drilling fluids and cement slurries, particularly when the ground plant seeds are used in high concentrations. Therefore, the ground seeds should contain no more than about 10 percent of particles passing a 100-mesh screen.

Most drilling fluids contain considerable quantities of particles which will pass a number 40 screen and be retained on a number 100 screen. Many drilling fluids, however, do not contain sufficient material in this particle size range to form an effective seal over a bridge composed of larger plant seed particles. Cement slurries usually contain substantially no particles in the 40- to 100-mesh range. Even those drilling fluids which contain particles in the 40- to 100-mesh range frequently do not form effective seals over a bridge of larger plant seed particles since the drilling fluid materials are usually too weak and soft. For these reasons, the additive should contain at least about 10 percent, and preferably about 20 or 25 percent, of particles in the 40- to 100-mesh range. A maximum of about 70 to 80 percent of particles in this range should be present in the additive to avoid too greatly decreasing the concentration of the larger particles building the primary bridge over which the 40- to 100-mesh material and mud or cementing fines form a seal.

A large proportion of crevices in formations penetrated by wells can be bridged by particles in the range from 10 to 40 mesh; therefore, it may be desirable to employ an additive containing as much as about 90 percent of particles in this range, the only other particles being about 10 percent of fines in the 40- to 100-mesh range. Preferably, however, a larger percentage of particles in the 40- to 100-mesh range, for example 20 percent to 25 percent, should be used, reducing the concentration of from 10- to 40-mesh material to about 75 or 80 percent. If the additive contains no particles which will be retained on a 10-mesh screen, it should contain at least about 20 percent of material in the 10- to 40-mesh range. If larger particles are present, however, the concentration of 10- to 40-mesh particles can be reduced to as low as about 15 percent. At least this minimum amount should be present to fill in the large holes between the larger particles and build a base over which the 40- to 100-mesh material and fine mud or cement solids can form a seal. Preferably about 20 to 25 percent of 10- to 40-mesh particles should be present, even when particles coarser than 10-mesh are included.

It will be understood that the amount of 10- to 40-mesh particles in the additive can sometimes be reduced below the minimum limit set above and still form a bridge. For example, substantially the same results can be obtained by cutting in half the amount of 10- to 40-mesh material in the additive and doubling the concentration of additive in a drilling fluid. Such an expedient, however, is seldom justifiable from an economic standpoint. A bridge of sorts can sometimes be formed with reduced amounts of 10- to 40-mesh material in the additive, even when the concentration of additive in the slurry is not increased. However, the bridge and seal will form much more slowly so that a large volume of slurry may be lost to the crevice during formation of such a bridge. In addition, such bridges as do form are sometimes weak so that several may form and break before a permanent one is achieved. For these reasons, it is generally advisable to observe carefully the minimum limits on amounts of 10- to 40-mesh material set out above.

As previously mentioned, the additives may contain substantially no material in the 4- to 10-mesh range.

In some areas, however, crevices, fissures, fractures, and the like are encountered which can be bridged only by such large particles. If material in the 4- to 10-mesh range is included at all, a rather high percentage, preferably about 50 percent, is usually employed. As much as 75 percent may be used, the other ingredients being the minimum amounts of 15 percent 10- to 40-mesh, and 10 percent 40- to 100-mesh materials previously discussed.

Particles which are retained on a No. 4 screen have been found to damage pumps if the pumps can handle them at all. In addition, such large particles tend to bridge across ports in bits, casing cementing shoes, circulating subs, and the like. For these reasons, the additives should include not more than about one percent of such particles, except in extreme cases.

Summarizing the above discussion, the additive should have a particle size distribution within the limits indicated in Table I.

TABLE I

| Sieve Analysis | | Percent Present |
|---|---|---|
| Through | Retained On | |
| -- | 4 | Not more than 1. |
| 4 | 10 | 0 to 75. |
| 10 | 40 | 15 to 90. |
| 40 | 100 | 10 to 80. |
| 100 | -- | Not more than 10. |

The preferred composition when 4- to 10-mesh material is used is shown in Table II.

TABLE II

| Sieve Analysis | | Percent Present |
|---|---|---|
| Through | Retained On | |
| 4 | 10 | 50 |
| 10 | 40 | 25 |
| 40 | 100 | 25 |

If 4- to 10-mesh particles are not present, the preferred composition is that described in Table III.

TABLE III

| Sieve Analysis | | Percent Present |
|---|---|---|
| Through | Retained On | |
| 10 | 16 | 50 |
| 16 | 40 | 25 |
| 40 | 100 | 25 |

PROPERTIES OF MATERIALS

Examples of operable hard portions of plant seeds include shells of nuts such as walnut, pecan, butternut, and hickory. Other suitable hard plant seed portions include the outer coating of the fruit of the Brazil nut tree, and the hard portions of coconuts, peach pits, apricot pits, cherry pits, and the like. These are presented by way of example only, and we do not intend to limit ourselves to these particular seed materials. The suitability of a particular seed portion should be determined rather by the properties listed below. Examples of unsatisfactory hard portions of plant seeds include peanut shells, almond shells, cottonseed hulls, and the like. Tests of both operable and inoperable materials have shown that hard seed portions suitable for our purposes should have the following properties:

(1) The material should be insoluble in oil and water and should not soften seriously in either of these liquids.

The terms "water resistant" and "oil resistant" will be employed hereinafter to mean that the material is both insoluble and does not soften seriously when exposed to these fluids for a period of at least about 30 days. These properties are necessary since the materials will normally be used in the presence of one or both of these liquids. The term "oil" is intended to mean crude petroleum oil or a fraction thereof.

(2) The material should have a softening point of at least about 120° F. if it is to be operable in even shallow wells. Preferably the softening point should be about 300° F. to permit use in deep, high temperature wells.

(3) The specific gravity of the material compared to water should lie between about 0.8 and 2.0 to avoid excessive tendency of the material to float or sink. Preferably the specific gravity should lie between about 1.0 and 1.5.

(4) The material should be strong to resist a tendency to break under the differential pressure which will be built up across the bridge of particles in or across fractures. We have found that the material should have a compressive strength of at least about 5,000 pounds per square inch if it is to be satisfactory for general use as a bridging agent. In this connection, it may be noted that the normal person cannot break in his fingers a particle which will pass a 4-mesh screen if the material has a compressive strength of at least about 1000 pounds per square inch, provided the particle meets the shape specifications set forth hereinafter.

(5) In addition to being strong, that is resisting rupture under load, the material must also have a high modulus of elasticity, that is, it should resist deformation. A material having a low modulus of elasticity will deform so readily that it will flow into fractures rather than bridging them. To avoid an undesirable degree of deformation, the material should have a modulus of elasticity of at least about 10,000 pounds per square inch.

(6) The material must not be too abrasive. It is well known, for example, that sand in drilling fluid exerts a serious abrasive action on steel drill pipe. A convenient measure of the abrasive nature of materials is the Mohs scale used by mineralogists. On this scale, common steel has a hardness of about 5; therefore, the bridging material should have a hardness less than about 5 to avoid abrasion of steel equipment. On the other hand, the material should not be too soft or brittle or it will itself suffer abrasion and breaking while the slurry is passing through pumps and is flowing in the well. A lower limit of about 2 on the Mohs' scale of hardness should be observed to avoid excessive abrasion of the particles of bridging material. This is especially true when the additive is used in drilling fluids which may be circulated down a well and back to the surface many times during drilling operations. A convenient test to determine if a material is in the required hardness range is to attempt to scratch the material with a common steel nail and with a fingernail. If the material can be scratched by the steel nail and cannot be scratched by the fingernail, it is in the desired range.

We have devised the following simple test for determining the mechanical strength characteristics of the hard plant seed particles. A number of granules of the particular nutshell are prepared which are as nearly as possible of uniform dimensions of 0.1 inch. A Vicat apparatus such as described in the A.S.T.M. Standards 1949, part 3, page 150, is employed. The Vicat needle is employed with the conically pointed needle inserted so that the non-pointed bottom of the needle is just flush with the bottom of the plunger. Positioning the needle in this manner provides a smooth circular flat hard surface which may be used as an impact face. A granule of the nutshell to be investigated is placed on a steel plate resting on the Vicat apparatus base and the entire apparatus leveled in the customary fashion. The set screw is maintained permanently loose throughout the test. The plunger is lowered until its base is in contact with the top of the granule and the adjustable indicator is adjusted on the plunger to be opposite the lower zero point on the millimeter scale. The plunger is then lifted to a height of some arbitrary number of millimeters as indicated by the indicators opposite the scale and the plunger abruptly released. Driven by the force of gravity, it strikes the granule. It may or may not fracture the granule. After each such test, a fresh granule is employed. The significant reading is the minimum distance through which this plunger must fall in order to crack the 1/10 inch granule. This number is termed the strength factor. All the tests that we have performed indicate that it is highly desirable to employ a material which gives a strength factor reading of about 20 or greater.

It will be understood that mixtures of materials meeting the above requirements may be used. For example, when reference is made hereinafter to a single material such as the "hard portion of a plant seed," the term is intended to indicate either seeds of a single species of plant or mixtures of seeds from several types of plants.

PARTICLE SHAPE

Two factors of particle shape are important: first, the particle should be granular as distinguished from fibrous or lamellated, that is, from a central point it should have approximately the same dimensions in all directions. If the particles are long or flat, they tend to be much weaker than granular particles with the same maximum dimension; therefore, fibrous or lamellated bridging agents falling within a given size range as determined by sieve analysis form a much weaker and less effective bridge than granular materials in the same range of sizes. A convenient measure of the granular nature of a particle is illustrated in Stratigraphy and Sedimentation by W. C. Krumbein and L. L. Sloss, 1951 edition, published by W. H. Freeman and Company. Page 81 of this reference presents a comparison chart by which the average sphericity factor of particles can be determined. The same chart also permits determination by comparison of the second important factor. This is the angularity of the particles. If a particle has many sharp angles and points, it interlocks with other similar particles more readily to form an effective bridge than if the edges and corners are rounded and smoothed. Krumbein and Sloss define this property by a "roundness" factor. Comparison of particles known to produce effective bridges to those known to produce less effective ones indicates that the particles should have an average sphericity factor of at least about 0.4 and an average roundness factor of not more than about 0.6. For convenience, these factors will be referred to hereinafter as Krumbein sphericity and Krumbein roundness, respectively.

CONCENTRATIONS

The recommended concentration of bridging agent in the slurry depends in part on the particular type of well operation in which the slurry is to be used and in part on the particular type of material employed. Normally at least about 2 pounds of the preferred material, walnut shells, should be used per barrel of drilling fluid. For the softer, weaker, and less angular materials falling within the limits outlined above, 2 pounds per barrel should be regarded as an absolute minimum limit. An upper concentration limit of about 25 or 30 pounds per barrel is usually observed for drilling fluids. This is principally for economic reasons. From a technical standpoint, use of even higher concentrations, for example up to about 60 pounds per barrel, is not objectionable and usually produces at least slightly stronger bridges in a slightly shorter time than when concentrations below about 30 pounds per barrel are employed. The ultimate upper concentration limit is slightly below the concentration at which sufficient finely divided additive is present to thicken the drilling fluid to such a degree that it becomes unpumpable.

In cement slurries, the same general concentration ranges apply as in drilling fluids. In practice, however, it is customary to employ high concentrations of at least about 20 to 30 pounds of walnut shells per barrel of cement slurry. As much as about 60 pounds per barrel are sometimes used. The increased cost of higher concentrations is small and the importance of sealing fractures is very great. A concentration sufficient to provide a large safety factor over the minimum concentration thought to be effective is generally considered advisable under these circumstances.

METHODS OF APPLICATION

The slurry of bridging additive in the supporting liquid can be prepared in a number of ways. In one method, the additive may be premixed with other dry materials such as clay or weighting agents for drilling fluid, or dry cement for cementing slurries. The dry mixture can then be added to the liquid as it is pumped into the well. Preferably proportioning means should be employed to insure that the concentrations of dry solids in the slurry are in the desired ranges. It is also possible to premix all the ingredients except the granular additive and add this material last, just before the liquid enters the well. A large batch of slurry containing the bridging agent may be mixed in a suitable container such as a tank or mud pit on the surface. This slurry may then be pumped into the well.

In drilling and casing cementing practices, the slurry is circulated down the well through a pipe and then up the well around the outside of the pipe. In casing cementing operations, the slurry may or may not be circulated to the surface outside the pipe. In drilling operations, on the other hand, the slurry is generally circulated to the surface and back down the pipe after suitable treatment. In casing cementing, the bridging additive is generally maintained at a suitable concentration in the slurry at all times. It is possible, however, to include "slugs" of the granular additive in small batches of the cement. This batch treatment is widely used during drilling operations, that is, a small batch of drilling fluid containing walnut shells, for example, is mixed and is pumped into the well as a separate plug in the drilling fluid. As this plug of slurry containing a high concentration of bridging agent passes the zone to which drilling fluid is being lost, it tends to enter the fractures or crevices and bridge them. The following drilling fluid then completes a seal over this bridge to prevent further loss.

In squeeze cementing operations, the entire slurry may contain the granular bridging additive. Sometimes, however, it is preferred to pump a considerable amount of neat slurry into the zone to be squeezed in order to fill the fractures and crevices before the bridging agent is added. The granular additive then bridges the crevices and a seal is formed over these bridges to permit development of the desired squeeze pressure. So-called low-water-loss cement can be used with considerable advantage in combination with granular bridging agents in squeezing operations to avoid excessive dehydration of cement slurries which might lead to improper setting.

Our invention will be better understood by considering the following examples:

Example I

To determine the suitability of various hard portions of plant seeds, their properties were tested. The results are presented in Table IV.

Water resistance of materials was determined by soaking them in water for about a month. Several of the plant seed materials such as peanut hulls, cottonseed hulls, orange seeds and watermelon seeds were eliminated on this basis alone. Most of the harder seed materials, however, were found to be quite satisfactory from this standpoint.

Specific gravity was determined, in most cases, by

TABLE IV

| Material | Water Resistant | Specific Gravity | Compressive Strength, p.s.i. | Modulus Elas., p.s.i. | Hardness, Mohs Scale | Average Thickness, in. |
|---|---|---|---|---|---|---|
| Black Walnut Shells | Yes | 1.3-1.4 | 20,000+ | 170,000 | 3 | 0.20 |
| Pecan Shells | Yes | 1.3-1.4 | 5,000+ | 10,000+ | 2-4 | 0.05 |
| Coconut Shells | Yes | 1.4 | 5,000+ | 10,000+ | 3 | 0.10 |
| Peach Pits | Yes | 1.3-1.4 | 20,000+ | 10,000+ | 3 | 0.15-0.25 |
| Brazil Nut Covers | | | | | | |
| Cherry Pits | Yes | 1.3-1.4 | 5,000+ | 10,000+ | 2-4 | 0.05 |
| Apricot Pits | Yes | 1.3-1.4 | 5,000+ | 10,000+ | 2-4 | 0.08 |
| Hickory Nut Shells | Yes | 1.3-1.4 | 20,000+ | 220,000 | 3 | 0.20 |
| English Walnut Shells | Yes | 1.3-1.4 | 5,000+ | 10,000+ | 2-4 | 0.04 |
| Plum Pits | Yes | 1.3-1.4 | 5,000+ | 10,000+ | 2-4 | 0.06 |
| Olive Seeds | Yes | 1.3-1.4 | 5,000+ | 10,000+ | 3 | 0.06 |
| Prune Seeds | Yes | 1.3-1.4 | 5,000+ | 10,000+ | 2-4 | 0.04 |
| Grape Seeds | Yes | | | | 2-4 | 0.02 |
| Almond Shells | Yes | 1.3-1.4 | 5,000+ | 10,000+ | 2-4 | 0.03 |
| Peanut Hulls | No | | | | <2 | 0.03 |
| Cottonseed Hulls | No | | | | 2.4 | <0.02 |
| Acorn Shells | Yes | 1.3-1.4 | 5,000+ | 10,000+ | 2-4 | 0.02 |
| Orange Seeds | No | | | | <2 | <0.02 |
| Grapefruit Seeds | No | | | | <2 | <0.02 |
| Lemon Seeds | No | | | | <2 | <0.02 |
| Watermelon Seeds | No | | | | <2 | <0.02 | dropping samples of the materials into liquids of various densities and observing whether they sank or floated. In the case of the coconut shells, however, the density was determined by use of a pycnometer. The specific gravities of all the hard seed materials tested were remarkably similar and fell well within the desired limits.

Compressive strength and modulus of elasticity were difficult to determine due to the small sizes of the particles available for testing. Large enough pieces of the walnut shells and hickory nut shells were obtained for measuring these properties with a fair degree of accuracy. It was possible to determine that other materials, such as pecan shells and peach seeds, greatly exceeded the minimum requirements, although accurate values could not be measured in most cases. No effort was made even to estimate strengths of materials which were not sufficiently thick to form particles having the proper shapes, or which were not water resistant or hard enough.

Hardness was determined by means of a scratch test using materials of known hardness. In some cases, particles of a single type of seed material seemed to vary in hardness. In some cases, available samples had rather uniform hardness. No seed material was found which was too hard. Many were found which were too soft.

A very important factor is the shell thickness. At least some large particles should be present in the ground product. Even if the composition is to be that described in Table III, for example, some of the particles must be retained on a 16-mesh screen and some should, preferably, barely pass a 10-mesh screen. The sieve openings for 10- and 16-mesh screens are 0.079 inch and 0.047 inch, respectively. Thus, the maximum dimensions of some of the particles should be at least about 0.05 inch, and preferably, for some at least, about 0.07 inch. In order to have a Krumbein sphericity falling within the specified limits, the minimum dimension of the particles should not be less than about one-half of the maximum dimension, and preferably should not be less than about three-fourths the maximum. Thus, the thickness of the original shell should theoretically be at least about 0.025 inch and preferably at least about 0.04 inch. This checks closely with the results reported in Example IV which show that almond shells, having an average thickness of only about 0.03 inch do not form 10- to 16-mesh particles having an average Krumbein sphericity of at least about 0.4 and do not form a suitable alternate to materials such as ground black walnut shells and ground coconut shells. English walnut shells, on the other hand, with an average thickness of about 0.04 inch, have been found to produce a satisfactory ground material.

The shells typically vary in thickness from point to point in a single shell. The values given in Table IV are average figures for the entire shell. The only exception is peach pits. Peach seeds are completely covered by closely spaced ridges. Therefore, a range is given showing the average thickness from the inside of the shell to the peaks of the ridges and the average thickness to the bottoms of the valleys between the ridges. It will be noted that the thickness even at the thinnest point is greater than the thickness of most other shells.

*Example II*

Tests were run to determine the crevice-sealing ability of ground black walnut shells. In these tests, various concentrations of the shells were added to drilling fluids. The drilling fluids were then pumped through slits of various widths and the concentrations necessary to seal the slits were noted. The drilling fluids had a viscosity of 50 to 100 centipoises as determined by a Stormer viscosimeter rotating at about 600 r.p.m. and a fluid loss of about 15 to 20 cc. as determined by the standard test described in API Code No. 29, second edition, July 1942 (tentative). The particle size distribution was that given in Table II. The average Krumbein roundness of the particles was about 0.3 and the average Krumbein sphericity was about 0.7. The results of these tests are presented in Table V.

TABLE V

| Concentration, lbs./bbl. | Slit Width, inches | Sealing Pressure, p.s.i. |
|---|---|---|
| 1 | 0.06 | maximum. |
| 1 | 0.08 | Do. |
| 1 | 0.12 | Do. |
| 1 | 0.14 | Do. |
| 1 | 0.16 | Do. |
| 1 | 0.20 | 0. |
| 2 | 0.20 | 0. |
| 3 | 0.20 | 410. |
| 4 | 0.20 | maximum. |
| 4 | 0.22 | 0. |
| 5 | 0.22 | 620. |
| 6 | 0.22 | maximum. |

The pump employed in these particular tests developed a maximum pressure a little less than 1000 p.s.i. Therefore, if the maximum pressure developed, the seal would withstand at least 800–1000 p.s.i. This is believed to be considerably in excess of most pressures developed in drilling operations or in casing cementing. In squeeze cementing, the pressure sometimes exceeds this range, of course, so development of a seal which will withstand at least this pressure is considered to be very important.

It will be noted that use of only one pound of nutshells per barrel of drilling fluid permitted sealing fairly large slits in the range of 0.14 to 0.16 inch in width. For wider slits, higher concentrations had to be used. In other tests, with very angular materials, as little as two pounds of black walnut nutshells per barrel of drilling fluid was able to form a seal over a slit 0.20 inch in width, which would withstand about 900 p.s.i. pressure.

*Example III*

The procedure of Example II was repeated using ground coconut shells. The particle size range was varied during the test, so this factor is listed in Table VI together with the other results of the tests. The average Krumbein roundness of the ground coconut shell particles was about 0.2. The average Krumbein sphericity was about 0.5.

TABLE VI

| Concentration, lbs./bbl. | Sieve Analysis | | | | | Slit Size, inches | Sealing Pressure, p.s.i. |
| --- | --- | --- | --- | --- | --- | --- | --- |
| | 0-4 | 4-10 | 10-40 | 40-100 | Through 100 | | |
| 1 | 0.4 | 68.8 | 22.9 | 7.7 | 0.2 | 0.06 | maximum. |
| 1 | 0.4 | 68.8 | 22.9 | 7.7 | 0.2 | 0.08 | 460. |
| 2 | 0.3 | 54.3 | 18.1 | 27.1 | 0.2 | 0.08 | maximum. |
| 2 | 0.3 | 54.3 | 18.1 | 27.1 | 0.2 | 0.10 | 600. |
| 3 | 0.2 | 44.8 | 15.0 | 39.9 | 0.1 | 0.10 | maximum. |
| 3 | 0.2 | 44.8 | 15.0 | 39.9 | 0.1 | 0.12 | Do. |
| 3 | 0.2 | 44.8 | 15.0 | 39.9 | 0.1 | 0.14 | Do. |
| 3 | 0.2 | 44.8 | 15.0 | 39.9 | 0.1 | 0.16 | Do. |
| 3 | 0.2 | 44.8 | 15.0 | 39.9 | 0.1 | 0.20 | 300. |
| 4 | 0.2 | 44.8 | 15.0 | 39.9 | 0.1 | 0.20 | maximum. |
| 4 | 0.2 | 44.8 | 15.0 | 39.9 | 0.1 | 0.22 | Do. |

It is apparent from these results that ground coconut shells, when used with the proper particle size distribution are as good as ground black walnut shells. Two points should be noted. First, probably due to the flatter shape of the particles, lower concentrations of the ground coconut shells did not seal quite as well as the more granular ground walnut shell particles. Second, the tests show that as little as 15 percent particles in the 10- to 40-mesh range are enough to fill the holes between larger particles used to bridge wide slits, crevices and the like.

*Example IV*

The procedure outlined in Example II was employed to test ground almond shells as a bridging agent. The particle size distribution was very close to that set out in Table II. The average Krumbein roundness of the particles was about 0.2. The average Krumbein sphericity was about 0.2. Results of the tests are reported in Table VII.

TABLE VII

| Concentration, lbs./bbl. | Slit Width, inches | Sealing Pressure, p.s.i. | Liquid Through, gal. |
| --- | --- | --- | --- |
| 2 | 0.04 | maximum | ½ |
| 2 | 0.06 | do | ½ |
| 2 | 0.08 | do | 1 |
| 4 | 0.10 | do | ½ |
| 4 | 0.12 | 250 | |
| 8 | 0.12 | maximum | |
| 12 | 0.14 | 400 | |
| 20 | 0.14 | 400 | |

It will be noted that the ground almond shells are distinctly inferior to ground walnut and coconut shells. The reason is the very thin nature of the almond shells. Actually the entire almond shell is reasonably thick, but the outer layer is soft and fibrous. Only the inner layer, which has an average thickness of about 0.03 inch, is sufficiently hard and strong to meet our requirements. These thin shells cannot, of course, be ground to form coarse particles of a sufficiently granular shape to be at all comparable to ground walnut and coconut shells. Ground almond shells cannot be regarded as falling within the limits of our invention since at least the particles larger than about 30-mesh do not have an average Krumbein sphericity greater than about 0.4.

*Example V*

To obtain a clear-cut evaluation of the importance of angularity, the procedure outlined in Example II was employed to compare the bridging abilities of angular and rounded particles of black walnut shells. Angular particles were obtained by grinding the shells in an attrition mill. Rounded particles were obtained by grinding the shells in a hammer mill, the sample being rerun through the mill four times to round off the sharp corners and edges. The samples of both angular and rounded particles were carefully screened into various size ranges and reblended to be sure the particle size distributions were the same. Both blends contained the particle size distribution indicated in Table VIII.

TABLE VIII

| Percent | Particle Size, Sieve No. | |
| --- | --- | --- |
| | Through | Retained On |
| 16⅔ | 4 | 5 |
| 16⅔ | 5 | 6 |
| 16⅔ | 6 | 10 |
| 12½ | 10 | 20 |
| 12½ | 20 | 40 |
| 25 | 40 | 100 |

The angular particles had a Krumbein sphericity of about 0.7, and a Krumbein roundness of about 0.2. For the rounded particles, the comparable figures were 0.8 and 0.8, respectively.

Results of fracture sealing tests are shown in Table IX.

TABLE IX

| Type Material | Concentration, lbs./bbl. | Slit Size, inches | Pressure, p.s.i. |
| --- | --- | --- | --- |
| Spherical | 20 | 0.20 | 0 |
| Angular | 20 | 0.20 | 2,300 |
| Do | 20 | 0.22 | 1,400 |

The importance of angularity is very apparent from these results.

*Example VI*

The method described in Example II was used to evaluate the crevice-sealing abilities of several commercially available lost circulation preventive additives.

A mixture of sawdust and textile fibers was added to drilling fluid in a concentration of 10 pounds per barrel. This bridging agent would not seal a slit more than .06 inch wide. In addition, the sawdust softened in the mud so that after three days' exposure, the sealing capabilities were serious impaired. Expanded perlite, screened to the particle distribution described in Table II, when added to a drilling fluid in a concentration of 60 to 80 pounds per barrel would not seal a fracture more than 0.1 inch wide.

Wood chips ground to pass a 4-mesh screen and be retained on a 100-mesh screen with particles distributed throughout the range were added to a drilling fluid in a concentration of 10 pounds per barrel. Initially a slit was sealed having a width of .12 inch. The seal withstood a differential pressure of 900 p.s.i. before breaking. When the seal was re-established and allowed to stand for three days, however, the wood chips had softened to such a degree that the seal withstood only 400 p.s.i.

Vesiculated polystyrene was ground to pass a 4-mesh screen and be retained on a 100-mesh screen with particles distributed throughout the range. A concentration of 20 pounds per barrel of this material in drilling fluid would not seal a fracture over .075 inch wide since the polystyrene crushed, due to the presence of air bubbles in the polystyrene, and flowed through larger slits.

Example VII

In the Procter A-2 well, Spraberry Field, Glasscock County, Texas, mud returns were lost at 5,315 feet. Large quantities of plant fibers and cottonseed hulls were added to the drilling fluid in an attempt to regain circulation. The same zone kept breaking down, however, on two subsequent days. The first time, complete circulation was lost and 65 barrels of mud were pumped into the formation before the loss could be stopped. The second and third times, 175 and 225 barrels were lost, respectively. When ground walnut shells arrived on location, the rate of mud loss was up again to about 125 barrels of mud per hour and only about 25 percent of the mud being put into the well was being recovered. The cost of the plant fibers, cottonseed hulls, and other lost circulation materials that had been tried was more than $1,600. Estimated loss of rig time brought the total cost up to $1,900.

To stop loss of circulation, twenty 50-pound sacks of ground walnut shells, with the sieve analysis indicated in Table II, were added to about 100 barrels of mud to produce a concentration of about 10 pounds per barrel. This batch of mud was pumped down the drill pipe and was followed by ordinary drilling fluid. Within 15 minutes, circulation was restored. No additional time was lost in drilling due to lost circulation to this zone. The cost of the twenty sacks of nutshells was approximately $215.

Example VIII

A well in the Pegasus Field, Midland County, Texas, was being drilled using drilling fluid containing both plant fibers and chopped cellophane. Complete circulation was lost at 6,683 feet. A batch of drilling fluid containing fifty sacks of ground walnut shells as described above was mixed in the suction pit to establish a nutshell concentration of about 30 pounds per barrel. By the time 70 barrels of this mud were displaced to the bottom of the well, complete returns had been obtained. Drilling continued with no loss for four days when at 7,145 feet, approximately 700 barrels of mud were lost to another highly fractured shale section. The mud system at this time contained a heavy concentration of plant fibers and cellophane flakes. Only 30 percent returns were obtained. Another batch of mud containing 30 pounds per barrel of nutshells was prepared as before. When this batch hit the bottom of the well, complete returns were obtained. The well was drilled without further difficulty.

Example IX

In a well at Bastian Bay, Plaquemine Parish, Louisiana, lost circulation occurred while drilling at 12,096 feet using a 17½ pounds per gallon drilling mud. Various lamellated materials, including mica flakes as well as some fibrous materials, were added in accordance with normal field procedures in this area. Circulation was not regained. A 500 barrel batch of mud containing 2500 pounds of ground walnut shells was prepared, 100 barrels of this batch were displaced into the drill pipe (volume of drill pipe—71 barrels), and pumping of regular drilling fluid was resumed. Mud was circulated for 9 hours after which time drilling was resumed with no further loss of mud for about a week. The shale shaker was bypassed during this time to avoid removal of the nutshells. At the end of a week, the mud was passed through the shale shaker again. Two days later loss of circulation started slowly. More ground walnut shells were then added in a concentration of about 8 pounds per barrel. Circulation was immediately re-established and no further difficulty occurred in drilling to about 15,000 feet.

Example X

A well in the East Gruver Field, Hansford County, Texas, lost 100 percent of the returns while drilling a bridge in the well at 4,802 feet. In six and a half days, 3000 barrels of mud containing about 40,000 pounds of plant fibers, cottonseed hulls and chopped cellophane were lost. A batch of mud was then prepared containing 50 sacks of ground walnut shells in a concentration of about 42 pounds per barrel of drilling fluid. This batch of mud was spotted on the bottom of the well. Then 100 barrels of mud were pumped in to force the slug containing the ground shells down to the thief zone. Operations stopped while a new pit of mud was mixed. Circulation was then re-established and only 35 more barrels of mud were lost in cleaning out the bottom of the well and reaming a core hole which had been drilled. The trouble with lost circulation was entirely overcome. Mud used in this case was a 15 percent crude oil emulsion in which the aqueous phase contained starch and bentonite. The mud weight was 8.6 pounds per gallon.

Example XI

Casing was cemented in 9 deep wells in the Andrews Area of West Texas. In some wells the cement included ground walnut shells to prevent loss of circulation, while in some no nutshells were used. The particle size distribution of the nut shells in every case was that set out in Table III. The results of the tests are reported in Table X.

Percent fill was determined by running a temperature survey to locate the top of the cement behind the casing and dividing the volume of the hole behind the casing by the volume of cement slurry used. The most important point to be noted is that in spite of a higher density slurry being used when nutshells were added, the percent fill behind the casing was much higher than when the nutshells were not used. The apparent fill of more than 100 percent comes about due to bypassing of some drilling fluid by cement. This is a common occurrence in casing cementing operations and undoubtedly occurred when the nutshells were not used. In fact, by passing was probably worse when nutshells were not present. The reason is that the degree of bypassing depends upon the rate of flow of the slurry. Greater bypassing occurs at lower rates of flow. When nutshells

TABLE X

| Well | Cement sacks | Expanded Perlite cu. ft. | Lost circulation material, lbs./sack cement | | Slurry Wt., lbs./gal. | Percent Fill | Cost, dollars | |
|---|---|---|---|---|---|---|---|---|
| | | | Cellophane Flakes | Nutshells | | | Per cu. ft. Slurry | Per ft. Lineal Fill |
| 1 | 900 | 900 | 0 | 0 | 12.7 | 76 | 1.32 | 0.74 |
| 2 | 950 | 950 | ¼ | 0 | 12.7 | 91 | 1.35 | 0.54 |
| 3 | 950 | 950 | ¼ | 0 | 13.2 | 94 | 1.53 | 0.54 |
| 4 | 1,150 | 1,150 | ¼ | 0 | 13.2 | 91 | 1.53 | 0.71 |
| 5 | 800 | 800 | ¼ | 0 | 13.2 | 83 | 1.53 | 0.64 |
| 6 | 1,100 | 0 | 0 | 2 | 14.7 | 115 | 1.64 | 0.44 |
| 7 | 1,500 | 0 | 0 | 2 | 14.7 | 117 | 1.64 | 0.55 |
| 8 | 1,500 | 0 | 0 | 2 | 14.7 | 116 | 1.64 | 0.55 |
| 9 | 1,000 | 0 | 0 | 2 | 13.7 | 140 | 1.38 | 0.32 | were not present, some of the slurry was lost to fractures, resulting in much lower rates of flow and consequently more by passing of mud. Another point to be noted is that although the cost of cement slurry per unit volume was, in general, greater when nutshells were used than when they were not, the average cost per lineal foot of fill behind the casing was considerably decreased.

*Example XII*

Seventeen squeeze cementing jobs were performed in six wells in the Andrews Area of West Texas. In some jobs, ground nutshells were used and in some they were not. In all cases, the nutshells had the particle size distribution set out in Table III. The results of the tests are presented in Table XI. The decision as to whether the job was successful or not and the remarks are taken directly from the field report of the tests.

avoid the possibility of bridging ports in the cementing equipment or perforations in the casing.

It will be apparent from the above description and examples that we have accomplished the objects of our invention; and improved additive for well-servicing liquids such as drilling fluids and cement slurries has been provided. It has been shown that this additive can be employed to form a drilling fluid or a cement slurry which will bridge and seal natural or artificially created fractures to prevent excessive loss of these liquids from the wells. Methods have been provided for use of the additive and slurries prepared from it.

We claim:

1. A drilling fluid including a lost circulation recovery material comprising granulated strong plant seed particles having a minimum strength factor of about 20, a substantial amount of the particles being retained on a 30 mesh sieve, and insufficient of the particles passing a 100

TABLE XI

| Well | Job | Depth, ft. | Material used | Squeeze Press., p.s.i. | | Success | Remarks |
|---|---|---|---|---|---|---|---|
| | | | | Maximum | Final | | |
| 1 | 1 | 9,037-9,080 | 200 sacks neat cement | 4,200 | 1,800 | No | Cement was displaced behind casing with 10 barrels water at 1,800 p.s.i. |
| | 2 | 9,037-9,080 | ___do___ | 7,200 | 7,200 | No | Drill stem test recovered drilling mud and salt water after drilling plug. |
| | 3 | 9,037-9,080 | ___do___ | 5,400 | 2,200 | No | Before end of job, pressure declined to 2,200 p.s.i. Cleared tool and perforations. |
| | 4 | 9,037-9,080 | 50 sacks neat cement, followed by 150 sacks with 4 lbs. nutshells per sack. | 6,500 | 6,500 | Yes | Tested perforations at 2,500 p.s.i. for 30 minutes. |
| 2 | 1 | 8,750 | 100 sacks neat cement | 0 | 0 | No | Cleared tool and perforations. |
| | 2 | 8,750 | 100 sacks neat cement, followed by 50 sacks with 4% bentonite and 4 lbs. nutshells per sack. | 4,100 | 2,800 | Yes | Tested at 2,000 p.s.i. for 30 minutes. |
| 3 | 1 | 13,953-14,000 | 150 sacks neat cement | 0 | 0 | No | Cleared tool and open hole. |
| | 2 | 13,953-14,000 | 100 sacks neat cement, followed by 100 sacks with 4% bentonite and 4 lbs. nutshells per sack. | 5,800 | 5,800 | Yes | None. |
| | 3 | 13,953-13,965 | 150 sacks neat cement, followed by 100 sacks with 4% bentonite and 4 lbs. nutshells per sack. | 5,800 | 5,800 | Yes | Swabbed 100 percent water. |
| | 4 | 13,930-13,944 | ___do___ | 5,900 | 5,900 | Yes | None. |
| | 5 | 13,725-13,773 | 100 sacks neat cement, followed by 100 sacks with 4% bentonite and 4 lbs. nutshells per sack. | 6,000 | 6,000 | Yes | Perforations swabbed 30 barrels water per hour. |
| | 6 | 13,450-13,510 | ___do___ | 0 | 0 | No | Perforations thought to be open to cavity encountered at 13,276. |
| 4 | 1 | 4,718-4,742 / 4,756-4,770 | 150 sacks neat cement, followed by 100 sacks with 4% bentonite and 4 lbs. nutshells per sack. | 4,000 | 4,000 | No | After drilling out cement in pipe squeeze failed at 800 p.s.i. on test. Perforations squeezed had been treated with 11,000 gals. 15% regular acid and 1,500 gals. mud acid and 4,000 gals. acidfrac with 1 lb. sand per gal. |
| 5 | 1 | 5,698 | 100 sacks neat cement | 1,200 | 0 | No | Squeeze required to repair hole in casing. |
| | 2 | 5,698 | 100 sacks neat cement, followed by 50 sacks with 4 lbs. nutshells per sack. | 1,750 | 1,250 | No | Cleared retainer and hole in pipe. |
| | 3 | 5,698 | 50 sacks neat cement, followed by 100 sacks with 4 lbs. nutshells per sack. | 4,550 | 4,550 | Yes | Reversed out 75 sacks with 4 lbs. nutshells per sack. Casing tested at 2150 p.s.i. for 30 minutes. |
| 6 | 1 | 8,300 | ___do___ | 3,000 | 0 | Yes | None. |

The most impressive fact to be noted from Table XI is that in several of the wells, neat cement squeezes were attempted without success. In well No. 1, for example, three squeezes with neat cement were employed in unsuccessful attempts to squeeze off a zone. The addition of 4 pounds of nutshells per sack of cement made possible successfully squeezing off all of these zones. It will be noted that in some cases even the presence of nutshells was insufficient to prevent loss of the cement slurry to the formation. For example, in job No. 6 on well No. 3, the perforations apparently were open to a cavern. In other cases, the failure of the squeeze cementing job, even when nutshells were used, may have been due to loss to caverns or to crevices too large to be sealed by the particles of nutshells employed. In at least some of these cases, the use of the particle size distribution described in Table II rather than the smaller particles set out in Table III would probably have resulted in successful squeeze jobs. Use of the finer particle size distribution in squeeze cementing is generally more desirable to mesh sieve to cause said drilling fluid to become too viscous to be pumpable, said strong plant seed particles being in a concentration of at least about 2 pounds per barrel of said fluid.

2. A drilling fluid containing granulated strong plant seed particles having a minimum strength factor of about 20, substantially all of which pass through a 4 mesh sieve and are retained on a 10 mesh sieve, said plant seed particles being in a concentration of at least about 2 pounds per barrel of said fluid.

3. A drilling fluid including a lost circulation recovery material comprising granulated strong nutshells having a minimum strength factor of about 20, a substantial amount of said material being retained on a 30 mesh sieve, and insufficient of said material passing a 100 mesh sieve to increase excessively the viscosity of said drilling fluid, said strong nutshells being in a concentration of at least about 2 pounds per barrel of said fluid.

4. A drilling fluid containing granulated nutshells having a minimum strength factor of about 20, substantially all of which pass through a 4 mesh sieve and are retained on a 10 mesh sieve, said nutshells being in a concentration of at least about 2 pounds per barrel of said fluid.

5. A drilling fluid containing granulated nutshells having a minimum strength factor of about 20, there being at least about 1 pound of said nutshells per barrel of said fluid in a size gradation from granules passing through a 4 mesh sieve down to those retained on a 10 mesh sieve, and there being at least about 1 pound of said nutshells per barrel of said fluid substantially all of which pass through a 10 mesh sieve and are retained on a 100 mesh sieve.

6. A drilling fluid containing granulated nutshells having a minimum strength factor of about 20, there being at least about 1 pound of said nutshells per barrel of said fluid in a size gradation from granules passing through a 10 mesh sieve down to those retained on a 16 mesh sieve, and there being at least about 1 pound of said nutshells per barrel of said fluid substantially all of which pass through a 16 mesh sieve and are retained on a 100 mesh sieve.

7. A drilling fluid containing granulated nutshells having a minimum strength factor of about 20 in a concentration of from about 2 to about 60 pounds of said nutshells per barrel of said drilling fluid, substantially all of which pass through a 4 mesh sieve, about half of the nutshell granules passing through a 10 mesh sieve and substantially all of said granules being retained on a 100 mesh sieve.

8. A well-servicing composition comprising a slurry, and from about 2 to 60 pounds of an additive per barrel of said slurry, said slurry being of the class consisting of aqueous drilling fluids, non-aqueous drilling fluids and Portland cement slurries, and said additive consisting essentially of granular particles of a water-resistant, oil-resistant, hard portion of a plant seed having a compressive strength of at least about 5,000 pounds per square inch, a modulus of elasticity of at least about 10,000 pounds per square inch, a hardness between 2 and 5 on the Mohs' scale, and a specific gravity between about 0.8 and 2.0 compared to water, said particles having an average Krumbein sphericity of at least about 0.4 and said additive consisting of not more than 1 percent of said particles retainable on a number 4 screen, from about 0 to 75 percent particles passing a number 4 screen and retainable on a number 10 screen, from about 15 to 90 percent particles passing a number 10 screen and retainable on a number 40 screen and containing a substantial amount of particles retainable on a number 30 screen, from about 10 to 80 percent particles passing a number 40 screen and retainable on a number 100 screen, and not more than about 10 percent particles passing a number 100 screen, all percentages being by weight.

9. A well-servicing composition comprising a slurry, and from about 2 to 60 pounds of an additive per barrel of said slurry, said slurry being of the class consisting of aqueous drilling fluids, non-aqueous drilling fluids and Portland cement slurries, and said additive consisting essentially of granular particles of the water-resistant, oil-resistant, hard portion of a plant seed having a compressive strength of at least about 5,000 pounds per square inch, a modulus of elasticity of at least about 10,000 pounds per square inch, a hardness between about 2 and 5 on the Mohs' scale, and a specific gravity between about 0.8 and 2.0 compared to water, said particles having an average Krumbein sphericity of at least about 0.4 and an average Krumbein roundness of not more than about 0.6, and said additive consisting of not more than 1 percent particles retainable on a number 4 screen, from about 0 to 75 percent particles passing a number 4 screen and retainable on a number 10 screen, from about 15 to 90 percent particles passing a number 10 screen and retainable on a number 40 screen and containing a substantial amount of particles retainable on a number 30 screen, from about 10 to 80 percent particles passing a number 40 screen and retainable on a number 100 screen, and not more than about 10 percent particles passing a number 100 screen, all percentages being by weight.

10. The composition of claim 9 in which said hard portion of a plant seed is black walnut shells.

11. The composition of claim 9 in which said slurry is a drilling fluid.

12. The composition of claim 9 in which said slurry is a suspension of Portland cement in water.

13. The composition of claim 11 in which said hard portion of a plant seed is black walnut shells.

14. The composition of claim 12 in which said hard portion of a plant seed is black walnut shells.

15. A liquid composition for sealing a coarse grained porous formation traversed by a well bore comprising a drilling fluid and particles ranging in particle size from 4 mesh to 100 mesh, such particles being of hard portions of plant seeds selected from the group consisting of black walnut shells, pecan shells, coconut shells, peach pits, cherry pits, apricot pits, hickory nut shells, English walnut shells, plum pits, olive seeds, and prune seeds.

16. A drilling fluid including a lost circulation recovery material comprising granulated strong plant seed particles selected from the group consisting of black walnut shells, pecan shells, coconut shells, peach pits, cherry pits, apricot pits, hickory nut shells, English walnut shells, plum pits, olive seeds, and prune seeds a substantial amount of the particles being retained on a 30 mesh sieve, and insufficient of the particles passing a 100 mesh sieve to cause said drilling fluid to become too viscous to be pumpable, said particles being present in a concentration of at least about 2 pounds per barrel of said fluid.

17. A drilling fluid containing granulated strong plant seed particles selected from the group consisting of black walnut shells, pecan shells, coconut shells, peach pits, cherry pits, apricot pits, hickory nut shells, English walnut shells, plum pits, olive seeds, and prune seeds, substantially all of which pass through a 4 mesh sieve and are retained on a 10 mesh sieve, said strong plant seed particles being in a concentration of at least about 2 pounds per barrel of said fluid.

18. A process for drilling a well comprising circulating in a well a drilling fluid containing a lost circulation recovery material comprising granulated strong plant seed particles having a minimum strength factor of about 20 a substantial amount of the particles being retained on a 30 mesh sieve, and insufficient of the particles passing a 100 mesh sieve to cause said drilling fluid to become too viscous to be pumpable, and contacting the walls of said well with said drilling fluid to form a bridge and seal over the formation openings through which drilling fluid is normally lost.

19. A process for drilling a well comprising circulating in a well a drilling fluid containing a lost circulation recovery material comprising granulated nutshells having a minimum strength factor of about 20, a substantial amount of said material being retained on a 30 mesh sieve, and insufficient of said material passing a 100 mesh sieve to increase excessively the viscosity of said drilling fluid, and contacting the walls of said well with said drilling fluid to form a bridge and seal over the formation openings through which drilling fluid is normally lost.

20. A process for drilling a well comprising circulating in a well a drilling fluid containing a lost circulation recovery material comprising a gradation of sizes of granulated nutshells having a minimum strength factor of about 20 with a sieve analysis of through 4 mesh and over 100 mesh in a concentration of at least 2 pounds per barrel of said drilling fluid, and contacting the walls of said well with said drilling fluid to form a bridge and seal over the formation openings through which drilling fluid is normally lost.

21. A process for drilling a well comprising circulating in a well a drilling fluid containing a lost circulation recovery material comprising a gradation of sizes of granulated nutshells having a minimum strength factor of about 20 with a sieve analysis of all through 4 mesh, at least about half being retained on a 10 mesh screen and substantially all being retained on a 100 mesh screen in a concentration of from 2 to 60 pounds per barrel of drilling fluid, and contacting the walls of said well with said drilling fluid to form a bridge and seal over the formation openings through which drilling fluid is normally lost.

22. A method of servicing a well comprising circulating in said well a composition comprising a slurry, and from about 2 to 60 pounds of an additive per barrel of said slurry, said slurry being of the class consisting of aqueous drilling fluids, non-aqueous drilling fluids and Portland cement slurries, and said additive consisting essentially of granular particles of a water-resistant, oil-resistant, hard portion of a plant seed having a compressive strength of at least about 5,000 pounds per square inch, a modulus of elasticity of at least about 10,000 pounds per square inch, a hardness between about 2 and 5 on the Mohs' scale, and a specific gravity between about 0.8 and 2.0 compared to water, said particles having an average Krumbein sphericity of at least about 0.4, and said additive consisting of not more than 1 percent particles retainable on a number 4 screen, from about 0 to 75 percent particles passing a number 4 screen and retainable on a number 10 screen, from about 15 to 90 percent particles passing a number 10 screen and retainable on a number 40 screen and containing a substantial amount of particles retainable on a number 30 screen, from about 10 to 80 percent particles passing a number 40 screen and retainable on a number 100 screen, and not more than about 10 percent particles passing a number 100 screen, all percentages being by weight.

23. A method of servicing a well comprising circulating in said well a composition comprising a slurry, and from about 2 to 60 pounds of an additive per barrel of said slurry, said slurry being of the class consisting of aqueous drilling fluids, non-aqueous drilling fluids and Portland cement slurries, and said additive consisting essentially of granular particles of water-resistant, oil-resistant, hard portion of a plant seed having a compressive strength of at least about 5,000 pounds per square inch, a modulus of elasticity of at least about 10,000 pounds per square inch, a hardness between about 2 and 5 on the Mohs' scale, and a specific gravity between about 0.8 and 2.0 compared to water, said particles having an average Krumbein sphericity of at least about 0.4 and an average Krumbein roundness of not more than about 0.6, and said additive consisting of not more than 1 percent particles retainable on a number 4 screen, from about 0 to 75 percent particles passing a number 4 screen and retainable on a number 10 screen, from about 15 to 90 percent particles passing a number 10 screen and retainable on a number 40 screen and containing a substantial amount of particles retainable on a number 30 screen, from about 10 to 80 percent particles passing a number 40 screen and retainable on a number 100 screen, and not more than about 10 percent particles passing a number 100 screen, all percentages being by weight.

24. The method of claim 23 in which said hard portion of a plant seed is black walnut shells.

25. The method of claim 23 in which said slurry is a drilling fluid.

26. The method of claim 23 in which said slurry is a suspension of Portland cement in water.

27. The method of claim 25 in which said hard portion of a plant seed is black walnut shells.

28. The method of claim 26 in which said hard portion of a plant seed is black walnut shells.

29. A process for drilling a well comprising circulating in said well a drilling fluid containing a lost circulation recovery material comprising granulated strong plant seed particles selected from the group consisting of black walnut shells, pecan shells, coconut shells, peach pits, cherry pits, apricot pits, hickory nut shells, English walnut shells, plum pits, olive seeds, and prune seeds, a substantial amount of the particles being retained on a 30 mesh sieve, and insufficient of the particles passing a 100 mesh sieve to cause said drilling fluid to become too viscous to be pumpable, and contacting the walls of said well with said drilling fluid to form a bridge and seal over the formation openings through which drilling fluid is normally lost.

References Cited in the file of this patent
UNITED STATES PATENTS

| Number | Name | Date |
|---|---|---|
| 2,319,182 | Van der Pyl | May 11, 1943 |
| 2,351,434 | Jessen et al. | June 13, 1944 |
| 2,398,347 | Anderson | Apr. 16, 1948 |
| 2,502,191 | Williams | Mar. 28, 1950 |
| 2,561,075 | Sidwell | July 17, 1951 |
| 2,815,079 | Goins et al. | Dec. 3, 1957 |

OTHER REFERENCES

Rogers: Composition and Properties of Oil Well Drilling Fluids, 1st ed., pub. 1948 by Gulf Pub. Co. of Houston, Texas, pages 449 and 450.